(12) United States Patent
Ziolo et al.

(10) Patent No.: US 6,451,220 B1
(45) Date of Patent: Sep. 17, 2002

(54) HIGH DENSITY MAGNETIC RECORDING COMPOSITIONS AND PROCESSES THEREOF

(75) Inventors: Ronald F. Ziolo, Webster, NY (US); Javier Tejada Palacios, Barcelona (ES); Elizabeth C. Kroll, Clinton Township, MI (US); Xixiang Zhang, Barcelona (ES); Rachel Pieczynski, Orchard Park, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 08/787,189

(22) Filed: Jan. 21, 1997

(51) Int. Cl.⁷ .................................................. H01F 1/20

(52) U.S. Cl. .................................. 252/62.54; 252/62.56; 252/62.6; 252/62.62; 252/62.57; 252/62.58; 252/62.59

(58) Field of Search ......................... 252/62, 54, 52.56, 252/62.6, 62.62, 62.57, 62.58, 62.59; 428/692, 694, 3 A

(56) References Cited

U.S. PATENT DOCUMENTS

| | | | | |
|---|---|---|---|---|
| 4,474,866 A | * | 10/1984 | Ziolo | ....................... 252/62.54 |
| 4,654,267 A | * | 3/1987 | Ugelstad et al. | ......... 252/62.54 |
| 5,322,756 A | * | 6/1994 | Ziolo | ....................... 252/62.54 |

\* cited by examiner

*Primary Examiner*—C. Melissa Koslow
(74) *Attorney, Agent, or Firm*—Robert Thompson

(57) ABSTRACT

A magnetic composition comprised of cobalt ferrite nanoparticles dispersed in an ionic exchange resin.

3 Claims, No Drawings

HIGH DENSITY MAGNETIC RECORDING COMPOSITIONS AND PROCESSES THEREOF

CROSS REFERENCE TO COPENDING APPLICATIONS AND RELATED PATENTS

Reference is made to commonly assigned copending applications: U.S. Ser. No. 08/178,540 filed Jan. 7, 1994, now U.S. Pat. No. 5,567,564, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps; U.S. Ser. No. 08/290,125 filed Jul. 15, 1994, now U.S. Pat. No. .6,078,720, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Ser. No. 08/332,174 filed Nov. 31, 1994, now abandoned, entitled "Magnetized Pigments and Method and Apparatus for Producing Magnetized Pigments", which discloses a method and apparatus for producing magnetized pigments by forming a pigment coating on an external surface of a magnetic material core wherein the magnetized pigment is produced by forming a vaporized core of a magnetic material and forming the pigment coating on the magnetic material core; U.S. Ser. No. 08/500,215 filed Jul. 10, 1995, now U.S. Pat. No. 5,641,424, entitled "Magnetic Refrigerant Compositions and Processes for Making and Using"; and U.S. Ser. No. 08/584,585 filed Jan. 11, 1996, now U.S. Pat. No. 5,714,536, entitled "Magnetic Nanocompass Compositions and Processes for Making and Using".

Attention is directed to commonly owned and assigned U.S. Pat. No. 4,474,866, issued Oct. 2, 1984, entitled "Developer Compositions Containing Superparamagnetic Polymers" which discloses a developer composition containing superparamagnetic polymers; U.S. Pat. No. 5,322,756, issued Jun. 21, 1994, entitled "Expedient Method for the Preparation of Magnetic Fluids and other Stable Colloidal Systems"; and U.S. Pat. No. 5,362,417, issued Nov. 8, 1994, entitled "Method of Preparing a Stable Colloid of Submicron Particles", which discloses submicron particles which are dispersible to form an aqueous colloid, also disclosed is a method of forming the stable dispersion which includes providing an ion exchange resin, loading the ion exchange resin with an ion, and treating the loaded resin to form nanoscale particles, additionally, the resin and nanoparticles can be fluidizing to form an aqueous stable colloid. Also of interest is U.S. Pat. No. 5,358,659, issued Oct. 25, 1994, entitled "Magnetic Materials with Single-Domain and Multidomain Crystallites and a Method of Preparation"; and U.S. Pat. No. 4,457,523, issued Oct. 10, 1995, entitled "Ferrofluid Media Charging of Photoreceptors".

The disclosures of each of the aforementioned copending applications and patents are totally incorporated herein by reference.

BACKGROUND OF THE INVENTION

The present invention relates to high density magnetic compositions and the use thereof in high density magnetic recording media, articles, and magnetic recording processes. More particularly, the invention relates to magnetic recording compositions and to processes for making and using thereof in, for example, analog and digital signal magnetic recording processes and applications thereof. The present invention provides high density magnetic recording media compositions comprising a nanocomposite, or nanocomposite particles comprising cobalt ferrite nanoparticles dispersed in an ionic exchange matrix. The compositions of the present invention are useful in a variety of magnetically responsive systems as indicated herein, and including, media, devices, and applications including but not limited to, for example, magnetic tape, magnetic discs, and related magnetic information storage materials.

The present invention also relates to a method for the preparation of high density magnetic recording media compositions having substantially only single domain cobalt ferrite nanoparticles as the active magnetic component. More particularly, the present invention relates to magnetic compositions possessing novel physical and magnetic properties including in embodiments: a primary particle size of the magnetic species of less than about 50 nanometers in diameter; a magnetic anisotropy constant of about $10^7$ erg/cm$^3$ at about 300° K; a magnetocrystalline anisotropy and nanoparticle volume product (KV) greater than or equal to about $5 \times 10^{-12}$ ergs; a magnetic storage density from about 1,000 to about 100,000 Gigabits per square meter; a blocking temperature($T_b$) equal to or above room temperature, 25° C. to about 400° K; superparamagnetism at above about 350° K; and wherein the nanoparticles are substantially single domain. The magnetic nanoparticles of the present invention possess excellent magnetic storage lifetimes, for example, from about $10^{10}$ seconds to about $10^{20}$ seconds for particles on the order of about 50 nanometers in diameter.

In embodiments of the present invention, there are provided high density magnetic compositions, for example, nanocrystalline cobalt ferrite compounds contained or dispersed in an isolating matrix, such as ion exchange matrix, and which compositions or composite materials enable magnetic recording densities of from about 1,000 to greater than about 100,000 Gigabits per square.

The present invention, in embodiments provides high density magnetic recording compositions comprised of nanoscopic magnetic species generally of the formula $CoFe_2O_4$ wherein the nanoparticles are dispersed in an ionic exchange matrix, for example, an ion exchange resin or ion exchange metal oxide.

A high density magnetic recording composition and methods of use refers for example, respectively, to a composition comprised of nanocomposite cobalt ferrite nanoparticles and an ionic exchange matrix, and the formulation of the nanocomposite compositions into articles and devices for magnetic recordation of signals or information.

PRIOR ART

Magnetic recording technologies are among the most important applications of permanent magnets today, reference for example, D. Jiles, *Introduction to Magnetism and Magnetic Materials,* Chapman and Hall, London, 1991, Chapter 14, Magnetic Recording. A typical storage magnetic medium consists of fine magnetic particles suspended in an organic binder adhering to a polymer substrate. During the recording process, different regions of the medium are briefly exposed to strong magnetic fields, so that each grain is magnetized in the desired direction. Each grain could thus in principle store one bit of data, so greater storage density could ideally be achieved by a medium containing many small grains than one containing a few large grains.

However, in order to serve as reliable storage devices, the grains must be capable of retaining their magnetizations for long periods of time in weaker, arbitrarily oriented ambient magnetic fields, reference for example, Richards et al., in the *Journal of Magnetism and Magnetic Materials*, 150 (1995) 37–50H.L, which describes magnetization switching in nanoscale ferromagnetic grains using a kinetic Ising model. Since experiments have shown the existence of a particles size at which the magnetizations are most stable, for example, E. F. Knetler and F. E. Luborsky, in the *J. Appl. Phys.*, 34 (1963) 656, there is a tradeoff between high storage capacity and long-term data integrity which must give rise to an optimum choice of grain size for any given material. During both recording and storage, the relationship between the magnetic field, the size of the grain, and the lifetime of the magnetization opposed to the applied magnetic field is therefore of great technological interest.

Modern magnetic storage technology has been reviewed in, for example, *Physics Today*, April 1995, the disclosure of which is incorporated herein by reference in its entirety, wherein there is disclosed current storage capacity of the most advanced magnetic storage devices is on the order of from 1 to about 100 Gigabits per square meter.

Until recently fine particle magnetic materials were studied only as powders, which made it difficult to differentiate the statistical properties of single grain switching from effects resulting from distributions in particle sizes, compositions, and local environments, or from interactions between grains. Magnetic force microscopy (MFM) and Lorentz microscopy provides the means for overcoming the difficulties in resolving the magnetic properties of individual single-domain particles.

An important metric in the behavior of magnetic materials is blocking temperature ($T_b$). The symbol $T_b$ refers to the relaxation time behavior of magnetic particles in an assembly. For magnetic particles with smaller volumes, the relaxation time is short and the particle response is fast under the influence of an external magnetic field. Larger particles are typically "frozen" and they do not respond superparamagnetically to an external field. Above the blocking temperature, the nanoparticle composition is superparamagnetic, that is, the composition exhibits zero hysteresis, and below the blocking temperature the nanoparticle composition is hysteretic, that is, the material has memory and hysteresis properties comparable to ordinary ferromagnetic materials. The $T_b$ is highly dependent upon the method used to measure the blocking temperature. The aforementioned terms and phenomena, are known, reference for example, *Science*, Vol 257, Jul. 10 1992, pages 219–223, and *J. Appl. Phys.*, Vol 73, No. 10, May 1993, pages 5109–5116.

Magnetic particles for use in, for example, magnetic storage media, that are known typically have a particle size of about 0.1 micrometer and a coercivity of about several hundred Oersteds. These particles readily retain magnetic patterns and thereby provide a method and means for magnetic information storage. However, these particles have an inherent functional performance limitation and problem in that these materials, when in the form of small particle sizes, for example, below about 0.1 micron, are superparamagnetic at room temperature, and are unsuitable for magnetic recording applications.

The following United States patents are noted:

U.S. Pat. No. 4,113,658, issued Sept. 12, 1978, to Geus, discloses a process wherein by applying certain controlled homogeneous precipitations techniques in the presence of a homogeneously distributed finely divided particulate supporting material, such as finely divided silica, there is effected a deposition precipitation of a metal or metal compound on the surfaces of the support particles, reference the working Examples.

U.S. Pat. No. 4,943,612, issued Jun. 24, 1990, to Morita et al., discloses an ultrafine particulated polymer latex having an average particle size of 100 nm or less, a crosslinked structure and a glass transition temperature lower than a value calculated by a weight fraction method.

U.S. Pat. No. 4,354,909, issued Oct. 19, 1982, to Takagi et al., discloses a magnetic recording medium comprising a non-magnetic substrate such as polyethylene terephthalate film and deposited on the surface of the substrate by an ionized cluster beam deposition method, at least one ferromagnetic material selected from the group consisting of cobalt, cobalt-containing alloys, mixtures of cobalt with other elements, and chromium dioxide; and a process for production thereof. The magnetic recording medium is characterized by having superior magnetic properties, especially superior coercive force, residual magnetic flux density and squareness ratio, and high mechanical strength.

U.S. Pat. No. 5,316,699, issued May 31, 1994, to Ritter et al., discloses a chemical process for producing bulk quantities of an iron-silica gel composite in which particle size, form, and magnetic state of the iron can be selected. The process involves polymerizing an ethanolic solution of tetraethylorthosilcate, with ferric nitrate present in water at low temperature under the influence of an HF catalyst. The chemical and magnetic states of the iron in the resultant composite are modified in situ by exposure to suitable oxidizing or reducing agent at temperatures under 400° C. Iron-containing particles of less than 200 Angstroms diameter, homogeneously dispersed in silica matrices may be prepared in paramagnetic, superparamagetic, ferrimagnetic and ferromagnetic states.

U.S. Pat. No. 4,238,558, discloses low density magnetic polymeric carrier materials containing a polymer material impregnated with a magnetic elemental metal or metal oxide derived from transition metal carbonyl compounds. According to the disclosure of this patent, the carrier particles are prepared by placing in a suitable vessel particles of a polymeric material, a suspending medium, and a transition metal carbonyl, heating the mixture with agitation for the purpose of thermally decomposing the transition metal carbonyl, causing the polymer to be impregnated with a magnetic elemental metal or metal oxide of a transition metal carbonyl, followed by cooling.

The disclosures of each of the aforementioned documents are totally incorporated herein by reference.

U.S. Pat. No. 5,358,659 assigned to the assignee of the present application, and which is incorporated herein by reference in its entirety, discloses a method of forming magnetic materials having tunable magnetic properties and the magnetic materials formed thereby. The magnetic materials contain both single-domain and multi-domain particles and have high initial permeability while maintaining coercivity and remanence in the material. A method for making a magnetic ferrofluid comprises providing a colloidal suspension of submicron ion exchange resin matrix, loading the resin matrix by ultrafiltration with a magnetic ion, precipitating single-domain particles within said resin and precipitating multidomain particles outside of the resin to form a stable colloidal dispersion of the resin and particles.

In the aforementioned commonly assigned U.S. Pat. No. 5,362,417 there is disclosed a method of forming a colloidal dispersion of submicron particles comprising: providing an ion exchange resin matrix; loading said resin matrix with an ion; and treating the resin to cause in-situ formation of submicron particles; and fluidizing said ion exchange resin and particles in an aqueous medium to form a stable colloid of said particles.

U.S. Pat. No. 4,474,866, assigned to the assignee of the present application, and which is incorporated herein by reference in its entirety, discloses a developer composition containing superparamagnetic polymers. The developer composition disclosed in this patent consists of a dispersion of fine particles of iron oxide in a polystyrene ion exchange resin. More specifically, the developer composition consists of $\gamma$-$Fe_2O_3$ (gamma) disposed in a sulfonated divinylbenzene cross-linked polystyrene resin.

In many modern magnetic recording media employing magnetic particulates, for example, those used in digital audio cassette recorder applications, the magnetic particle size distribution appears to be split into domains. Thus, it is expected that due to this distribution, larger particles comprise two domains, and the small particles, for example, on the order of 100 Angstroms or less, are single domain. Questions remain concerning the mechanisms involved in the magnetization processes of magnetic particles. This situation presents a formidable obstacle in attempting to control both the time dependence of magnetic switching processes and the viscous remanent magnetization. The existence of complex magnetization patterns inside each particle affects, in a negative sense, the magnetization intensity pattern in the magnetic medium where the particles are deposited. Therefore, it is very desirable and important to have smaller single domain particles with high magnetization values. However, if this were the situation it would be necessary to be concerned with the problem of magnetic stability at room temperature. That is, the blocking temperature of the particles should be above at least about room temperature or the ambient temperature at which the magnetic media is operational.

There exists a need for high density magnetic recording compositions and systems that are suitable for use in magnetic processes and magnetic applications.

Still further, there is a need for high density magnetic recording nanocrystalline nanocomposite particles that permit low cost, clean, and optionally dry micron and submicron polymeric composite particles that can be selected for use in a magnetic liquid or solid formulations, and utilized as an active component in preparing high density magnetic recording media.

These and other needs are achievable with the present invention in embodiments thereof.

SUMMARY OF THE INVENTION

It is an object of this invention to overcome or minimize the problems encountered in the art and provide nanomagnetic compositions which are suitable for use in high density magnetic recording media and applications.

Other objects of the present invention include: providing a magnetic composition comprised of cobalt ferrite nanoparticles dispersed in an ionic exchange resin; and providing a high density magnetic recording media composition comprising a nanocomposite comprising cobalt ferrite nanoparticies dispersed in an ionic exchange matrix wherein the cobalt ferrite nanoparticles are present, for example, in amounts of from about 0.2 to about 40 weight percent, and the ionic exchange resin is present in an amount of from about 99.8 to about 60 weight percent; the cobalt ferrite nanoparticles have an average diameter of from about 2 to about 100 nanometers; magnetic storage densities from about 1,000 to about 100,000 Gigabits per square meter; and wherein the nanoparticles are superparamagnetic above or equal to about 600° K and are substantially single domain.

DETAILED DESCRIPTION OF THE INVENTION

The present invention is directed to in embodiments, magnetic compositions suitable for use in high density magnetic recording processes and systems. The properties of the magnetic compositions of the present invention enable improved magnetic recording processes. Although not desired to be limited by theory, it appears that the enhanced properties of the magnetic compositions and processes of the present invention are attributable in large part to the nanoscopic size, uniform distribution, and disposition of the magnetic species within the ionic exchange matrix.

In embodiments of the present invention, there is provided a method for the preparation of high density magnetic recording media compositions having substantially only single domain cobalt ferrite nanoparticles as the active magnetic component. The present invention, in embodiments, provides high density magnetic recording magnetic compositions possessing excellent physical and magnetic properties including: a primary particle size of the magnetic species less than or equal to about 50 nanometers in diameter; a magnetic anisotropy constant of about $10^7$ erg/cm$^3$ at about 300° K; a magnetocrystalline anisotropy and nanoparticle volume product (KV) greater than about $5\times10^{-12}$ ergs; a magnetic storage density of from about 1,000 to about 100,000 Gigabits per square meter; a blocking temperature($T_b$) in the range from about 300 to about 600° K; and wherein the nanoparticles are substantially single domain. The magnetic nanoparticles of the present invention possess excellent magnetic storage lifetimes, for example at room temperature, about 25° C., from about $10^{20}$ seconds for the smallest particles, comprised of about 2 to 20 molecules to about $10^{40}$ seconds for particles with an average size of about 10 nanometers in diameter.

The nanocomposites of the present invention comprising nanoscopic CoFe$_2$O$_4$ particles possess "blocked" magnetic moments at and above about room temperature, and have coercivitity properties at about 300 K which are similar to known magnetic media. In view of its small size and the aforementioned magnetic properties the nanocrystalline cobalt ferrite particle clusters contained in an isolating ionic matrix, the nanocomposites of the present invention are useful as the magnetizable component in various high density magnetic storage media, devices, and applications, as illustrated herein.

The magnetization pattern or imprint recorded in a magnetic medium controls the reading response, while the product of the magnetic anisotropy and the volume of the particles, in the case of single domain particles, determines the degree of magnetic stability. For example, as the particles are made smaller, the particles become superparamagnetic at temperatures below about room temperature and consequently can not be used in magnetic recording applications. The exists a need to reconcile the particle size, storage density, magnetization, and magnetic anisotropy issues with the time dependence of magnetic storage switching processes.

The present invention in embodiments, provides magnetic compositions and magnetic data storage systems incorporating novel magnetic compositions. In an exemplary embodiment, a high density magnetic storage media is provided in a magnetic nanocomposite comprising cobalt ferrite nanoparticles of the formula $CoFe_2O_4$ with an average particle size diameter, as measured by known spectroscopic and particle measurement means, for example, a Coulter counter, sedimentation, microscopy, of about 100 Angstroms or less and an ionic exchange matrix, such as a resin or an ion exchangeable metal oxide. When the magnetic nanocomposite material of the present invention is employed in various magnetic storage media the information storage density or capacity of the recording media is increased by several orders of magnitude, for example, from about 10 to about 1,000 times, over currently available materials. The magnetic nanocomposites, in embodiments, can be dispersed in a variety of known resin or binder materials for the purpose of formulating and preparing various useful magnetic storage media, for example, non-ionic and ionic thin and thick film coatings, and articles. Exemplary film coating resins include, for example, polyesters, polyamides, polyimides, and the like, and mixtures thereof.

The term "domain" is described, for example, in C. P. Bean and J. D. Livingston, *J. Appl. Physics* 30, 120s (1959) and B. D. Cullity, *Introduction to Magnetic Materials*, Addison-Wesley Publishing Co., MA, (1972), both references are incorporated by reference in their entirety. Although not wanting to be limited by theory, it is believed that the presence of substantially or exclusively single-domain crystallites in the compositions of the present invention enable the combination of the aforementioned novel magnetic properties.

The energy barrier for coherent magnetization rotation of a single domain particle is determined by the magnetic anisotropy, K, and the external applied field, (H). Without a magnetic field present, there are two equal local minima separated by an energy barrier (KV). In the presence of an external field applied parallel to the "easy axis" which is the direction such that when the magnetic moment is along this axial direction, the magnetic energy of a body takes its minimum absolute value and is smaller than the anisotropy field, (Ho), then the upper minimum will be separated from the lower minimum by an energy barrier of height given by U where $U=KV(1-H/Ho)^2$.

The stable magnetic state of the particle corresponds to the magnetization vector M parallel to H. The anisotropy filed, (Ho) is related to the saturation magnetization of the particle, (Mo), and with the anisotropy constant by $Ho=2K/Mo$.

The switching rate, $\Gamma$, for thermally activated processes decrease exponentially with the ratio of the energy barrier and the thermal energy, $k_BT$, and is given by the relationship $\Gamma=\omega\exp(-U/k_BT)$ wherein $\omega$ is usually on the order of the ferromagnetic resonance, $\omega=10^{10}$ Hz.

Magnetic recording is often accomplished on a time scale of $10^{-8}$ seconds. If a field larger than Ho is applied then the energy barrier is near zero and the switching will occur in a time period on the order of 1 nanosecond. In order to provide long storage times at room temperature that are on the order of $10^8$ seconds, then the relation for the switching rate, $\Gamma$, imposes a requirement that the energy barrier $U=KV$ be about $3\times10^{-12}$ erg, assuming that T=300 K, $\omega=10^{10}$ Hz and the lifetime $\tau=10^8$ seconds. For the magnetic nanocomposites of the present invention, the magnetic anisotropy constant $k_B$ ranges between about $10^7$ erg/cm$^3$ at room temperature to about $10^8$ erg/cm$^3$ at 4.2 K. This indicates that the minimum size required for the particles is about 50 Angstroms in diameter. This prediction is in agreement with the experimental results for the blocking temperature obtained from the maximum of the zero field cooled (ZFC) magnetization measurements. The blocking temperature corresponds to the random orientation of the magnetic moments of the of the particles and mathematically defined as the temperature at which the experimental relaxation time of the particles coincides with the experimental resolution time, which is about 50 seconds. For the particles of the present invention, the blocking temperature appears at about $T_b=300$ K, when the applied field is about 100 Oe, and a $T_b=180$ K when the applied field is 4,000 Oe. Using the relation of the energy barrier, the switching field, Ho, of the particles at room temperature can be estimated to be Ho=1,000 Oe.

From isothermal magnetization versus field curves, it is possible to obtain a variation of the anisotropy and coercivity with temperature. The anisotropy field ranges from a few thousand Oe at room temperature to about 50,000 Oe at 4.2 K. By further reducing, to for example less than about 30 to 50 nanometers the size of the magnetic particles of the composite, it appears possible to store even greater amounts of information, such as 10 to about 1,000 times more, however, this would require employing lower temperatures. Information density decreases with increasing volume of the particles; thermal (magnetic) stability increases exponentially with a decrease in temperature.

The particles of the present invention possess in embodiments: smaller particle volume and magnetic stability which enables: 1) better control of the time dependence of magnetic switching processes; and 2) improved control of the viscous remanent magnetization of the magnetic recording media. In these systems all the particles are single domain particles obeying the same laws for magnetic switching. The viscous remanence decays logarithmically in time being the so called magnetic viscosity, S, the coefficient in front of In t. S has a polar law dependence on T (T") where the exponent n is fully determined by the shape of the distribution function of the volume of the particles.

The crystalline anisotropy of the particles is an intrinsic property of the particles while the shape and volume are extrinsic properties which also affects the dynamics of the particle.

Magnetic recording media are generally produced by coating on the surfaces of a substrate a magnetic coating composition containing magnetic powder particles dispersed in a solution of a resin, that is a binder, in an organic solvent. Alternatively, aqueous emulsion type magnetic coating compositions are known and useful in the manufacture of magnetic recording media, reference for example, U.S. Pat. No. 4,943,612. The magnetic coating compositions of the present invention generally contains from about 1 to about 60 weight percent of magnetic powdered nanocomposite with the balance comprised of binder.

The magnetic coating compositions prepared are generally applied to a substrate at a thickness of the magnetic recording layer of from about 1 to about 100 microns, although suitably highly magnetic films are obtained with coating thicknesses less than about 1 micron.

High density magnetic recording compositions and processes for making and using, can be achieved, for example, by providing an ion exchange matrix; loading the matrix with cobalt and iron ions capable of forming a magnetic phase; treating the loaded matrix to cause in situ formation of magnetic particles or magnetic nanoclusters, and thereafter isolating and sizing the nanocomposite particles as desired.

The term "matrix" refers to the metal ion binding and metal ion exchangeable support media used to grow the magnetic nanocrystalline particles, and includes resin or metal oxide materials as illustrated herein.

The present invention provides, in embodiments, magnetic compositions which exhibit heretofore unknown magnetic phenomena. Although not wanting to be limited by theory it is believed that the unique properties of the nanometer particles are due to their high magnetocrystalline anisotropy. At room temperature, the magnetic moment of the particles, for example, as small as 5 nm, is blocked. The particles are very easily oriented by applying a large magnetic field.

The nanomagnetic compositions of the present invention comprise: a magnetic component comprising magnetic or magnetizable nanoscopic mixed metal oxide nanoparticles of cobalt and iron dispersed and stabilized within a ion exchange matrix, such as an ionic exchange resin or inorganic ion exchange active material, and optional additives, such as additives to control or enhance the magnetic, flow, and performance properties and utility of the magnetic composition, such as colorants, security taggants, contamination or wear indicators, fragrance or odorants, corrosion inhibitors, humectants, viscosity improvers, and the like.

In embodiments, a nanocomposite comprising $CoFe_2O_4$ in a sulfonated ionic exchange resin, can prepared as disclosed and in accordance with the aforementioned U.S. Pat. No. 5,362,417, and as described and illustrated herein.

The preparative processes of the present invention, in embodiments, can also be partially accomplished in accordance with the aforementioned commonly owned and assigned U.S. Pat. No. 5,358,659, specifically for the preparation and provision of the magnetic nanocomposite starting materials.

The nanomagnetic compositions obtained in accordance with the present invention can be used in a variety of ancillary magnetic devices and processes with magnetic field strengths of less than about 1 Tesla.

The nanomagnetic compositions of the present invention are compositionally robust and quite stable to, for example, extensive magnetic pulsing or thermal cycling, for example, in excess of several million cycles, for example, in embodiments when the temperature is maintained at or below about 200 to about 300 K.

A preferred nanomagnetic composition in embodiments of the present invention, comprises a nanocomposite comprising a nano-scale $CoFe_2O_4$ highly dispersed, for example, wherein there is no evidence or indication of aggregation of individual cobalt ferrite nanoparticulates, in an ion exchange polymer resin or inorganic ion exchange compound.

The magnetic species contained in the cobalt ferrite nanoparticles can be stoichiometric, non-stoichiometric, and mixtures thereof, of the formula $CoFe_2O_4$, and can include for example, closely related molecular and associative analogues and homologues, such as oxygenates having the same or similar formula.

The magnetic storage density of the magnetic nanocomposites of the present and magnetic films or media derived therefrom, in embodiments, is for example, from about 1,000 to about 100,000 Gigabits per square meter. In embodiments, the nanocomposites can have a magnetic storage density in excess of 100,000 gigabits per square meter.

The magnetic recording media has a high signal to noise ratio, for example, in embodiments, from about 10:1 to about 100,000:1. Although not wanting to be limited by theory, it is believed that the enhanced signal to noise properties of the cobalt ferrite compositions of the present invention are attributable to the narrower size distribution or dispersion of the nanoparticulates. In embodiments, the nanocomposite can be prepared with particles which are substantially monodispersed in particle size distribution.

The magnetic recording compositions of the present invention can, in embodiments, further comprise a dopant material, for example, in amounts of from about 0.01 to about 10 weight percent of the composition, including for example, elements from Group I, Group II, Group IIIa/b, rare earth elements, transition metals, oxides thereof, and mixtures thereof. In embodiments, the dopant can be incorporated in the nanocomposite during the preparation thereof. In embodiments, the dopant, if desired, can be incorporated in the binder resin, for example, when forming films of the magnetic recording media. If desired, the dopant can be incorporated into both the nanocomposite and the binder resin. Exemplary dopants include elements, like those contained in Groups I, II, and III, ions, or molecules thereof, for example, oxides, which can be non-magnetic or magnetic, and which magnetic materials may be permanent or inducible magnetic materials. Other dopants include Group IIIa/b elements, those belonging to the transition metals, including, for example, Cu and Zn, rare earth elements, and oxides thereof.

In embodiments, the present invention provides a magnetic recording composition comprising: nanocomposite particles comprised of cobalt ferrite nanoparticles substantially of the formula $CoFe_2O_4$ in an amount of from about 0.2 to about 40 weight percent, dispersed in an ionic exchangeable matrix such as a resin or oxide present in an amount of from about 99.8 to about 60 weight percent based on the combined weight of the nanoparticles and the ionic exchange matrix; optionally a binder resin; and optionally a dopant, wherein the magnetic storage density thereof is greater than or equal to about 100,000 Gigabits per square meter.

In embodiments, the present invention provides a magnetic recording process comprising: forming a magnetic recording media with a magnetic recording composition as illustrated herein; and forming a magnetic imprint thereon; wherein the magnetic storage density thereof is greater than or equal to about 100,000 Gigabits per square meter.

Useful ion exchange polymer resins include sulfonated polystyrene resins, optionally crosslinked with, for example, divinyl benzene, and perfluorinated polysulfonic acid containing resins. Alternatively, the ion exchange matrix selected can be inorganic ion exchangeable metal oxide and mixed metal oxide compound or compounds, for example, known natural and synthetic zeolites and molecular sieves, and inorganic layered compounds, such as hydrotalcites and mica, and mixtures thereof.

The ionic exchange matrix selected is preferably an organic ion exchange resin which provides a polymeric dispersion support matrix and nucleation sites during the formation of the magnetic nanocrystalline particles.

According to embodiments of the present invention, a crosslinked polymer resin matrix having chemically addressable sites can be selected to prepare the nanomagnetic compositions. Such a matrix is provided by, for example, an ion exchange resin. The majority of organic ion exchange resins are based upon a matrix of crosslinked polystyrene which provides a chemically and physically robust micro structure of the type needed to produce the fine particulate nanocomposite. A preferred resin is a polystyrene sulfonic acid (PSSA) ion exchange resin crosslinked from about 1 to 16% with divinylbenzene. More preferably, a 2 to 8% divinylbenzene crosslinked sulfonated polystyrene can be selected. Illustrative examples of suitable ion exchange resins include those polymers possessing chemically addressable sites dispersed throughout their matrix, or on their surface, and which sites can be used to generate an ionic component in situ. Specific examples of these resins include sulfonated and carboxylated polystyrenes, strongly acidic polyphenolics, polysulfonic acids prepared from monomers of the formula R—$CH_2$—$SO_3$—$H^+$, weakly acidic polyacrylics with a pH of about, for example, 5 to 6, for example, polycarboxylic salts prepared from monomers of the formula R—COO—$Na^+$, wherein R is a polymerizable monomer with from 2 to about 20 carbon atoms, for example, alkyl, alkylene, arylalkylene or arylalkyl groups, perfluorinated polysulfonic acids, weakly acidic chelating polystyrenes, and the like, with strongly acidic sulfonated polystyrenes and perfluorinated polysulfonic acid salts being preferred. In addition, anionic exchange resins such as Baker IONAC NA-38, Baker IONAC A-554, Dowex SBR, AMBERLITE IRA-400, Dowex IX8-100, NAFION® available from DuPont, and AMBERLYST resins may also be used. Other suitable resins can be selected provided, for example, that they are compatible with the ion exchangeable resin or resins selected.

The resin matrix is preferably capable of withstanding, during preparation and processing and in various magnetic process applications, repeated cycles of drying, gelling, swelling, and de-swelling, and preferably, will not decompose thermally below 120° C. The resin is preferably chemically unaffected by exposure to strong acids, bases or redox solutions with the exceptions of undergoing the desired ion exchange reactions.

The resin may be of an analytical or an industrial grade. Aside from differences in cost and size, the industrial grade resins typically have more color than the analytical grades. Most of the color associated with industrial grade resins is temporary and is easily removed if desired by solvent washing, usually with water or alcohol or mixtures thereof. After washing, the industrial grade resin may retain a weak amber color similar to the analytical grade.

Resin beads may be in embodiments, from about 20 to about 500 mesh and are preferably from about 20 to about 400 mesh size or between about 850 and about 38 microns. More preferably, the resin beads are from about 200 to about 400 mesh or between about 75 and 38 microns. The larger size beads have two advantages over the smaller beads. First, the processing time is shorter, for example, for about 1 to about 100 minutes, when using the larger beads due to faster settling rates and ease of decanting. Second, the larger beads are mechanically weaker than the smaller beads due to greater osmotic shock effects during their manufacture. Thus, material prepared from the larger beads crushes and presumably micronizes more easily than those made from the smaller beads. Despite its weaker mechanical strength, the lower cost larger resin retains its ion-exchange capability through and even beyond ten-cycles of loading. The smaller sized ion exchange matrix particles have the advantage of being more readily dispersible in the liquid vehicle without the need for additional particle size reduction processing steps.

Commercial ion exchange resins for use in the present invention include polystyrene sulfonic acid ion exchange resins which may be obtained from such manufacturers as Rohm and Haas, Du Pont, and Dow Chemical.

Alternatively, the resin selected may be submicron in size, for example, less than about 1 micron, from about 0.01 to about 1.0 micron, and preferably from about 0.05 to about 0.5 microns, so that no additional micronization step is necessary. Examples of such a matrix include a submicron sulfonated polystyrene resin, designated SSPR for the purposes of the present invention, available from Rohm & Haas in emulsion form. Additional submicron resins appropriate for use in the present invention include any submicron resins which accomplish the objects of the present invention and which do not interfere with the characteristics of the desired material properties disclosed herein.

Once a resin is selected, the resin matrix is next loaded with the precipitate precursor ions including, for example, cobalt, and ferrous or ferric ions in a manner described in the aforementioned U.S. Pat. No. 4,474,866 to Ziolo.

The magnetic ion loaded resin is treated so as to cause an in-situ precipitation of the material desired for dispersion. The nanometer size metal ion containing particles may be precipitated as compounds, for example as iron sulfide clusters, in their elemental forms, or preferably as the metal oxides, reference the aforementioned commonly assigned U.S. Patents and copending applications, and which particles are preferably selected based on an empirical determination of their respective nanomagnetic properties. The nanomagnetic particles are, in embodiments, from about 1 to about 100 nanometers in mean particle diameter, preferably from about 1.0 to about 50 nanometers, and more preferably from about 5 to about 10 nanometers in diameter.

Once the nanomagnetic composite material has been formed, the ion exchange process and subsequent formation of particles may then be repeated several times, for example, up to about 10 to 20 times, to achieve higher loading, for example, in excess of about 20 to about 40 weight percent, of magnetic species in the composite particles. As the number of particles increases or their size increases the crosslinked ion-exchange polymer matrix becomes stressed and eventually ruptures. In a typical ion exchange resin, sufficient stress may occur after the first loading. Rupture of the composite particles may be easily detected for example, texturally, visually or microscopically. Micronization, by for example, ball-milling of the composite product in a stable liquid or solid medium or vehicle will lead to the formation of the stable dispersion of the nanomagnetic composite material in about 30 to about 180 minutes. A suitable vehicle is any vehicle which allows dispersion including, for example, alcohols and alcohol miscible liquids and the like solvents, such as methanol and ethylene glycol. Examples of suitable liquid vehicles include known liquids including water, alcohols, polyols, glycols, glycol ethers, ethers, and liquid metals, such as mercury, gallium, and mixtures thereof. Thus, in embodiments, the nanomagnetic compositions may be formulated in, for example, methanol, or alternatively, a mixture of methanol and other miscible alcohols. The liquid medium may further include any liquid material which does not adversely effect the desired magnetic, mechanical, electrical or optical properties of the nanomagnetic composition or performance of the composition in various magnetic process applications, for example, alcohol soluble or miscible polymers or surfactants.

Micronization as used herein is defined as the formation of a liquid or solid mixture through mechanical comminution of the polymeric or inorganic matrix particles containing the discrete nanocrystalline nanomagnetic particles. Micronization may be accomplished by attrition, air attrition followed by dispersion in alcohol, shaking, milling, ball milling, shaking or ball milling directly in alcohol, or the like media. Shaking or ball milling are generally preferred for simplicity and economy. Coarse particles may be removed by filtration or centrifugation if desired although additional separations or removal of large sized particles is generally believed to be, in embodiments, unnecessary.

When using submicron resin particles, no micronization step is required to form a stable colloid. A micronization step may however, be used with a submicron resin if smaller submicron particles are desired.

When a micronization step is selected, grinding or milling time is greatly reduced due to the friable nature of the nanomagnetic nanocomposite. According to the present invention, submicron particles may be produced by growing or building from the molecular level rather than grinding larger particles down to form smaller particles. Thus, in embodiments, the ionic polymeric matrix can be formed using known submicron particle size polymerization techniques followed by in situ impregnation or formation of the magnetic nanocrystalline particles with the resulting submicron sized polymer matrix.

In exemplary examples of submicron resins, diafiltration techniques can be used in place of conventional ion exchange techniques to process the resin because of the very small size of the resin beads. The submicron resin beads may be suspended in an aqueous colloidal form prior to incorporation of the precursor metal ions, thus resulting in a stable colloidal dispersion of the resin and magnetic nanocrystalline particles subsequent to appropriate chemical treatment to convert the Ionically associated metal ion species to the desired magnetic species. The nanomagnetically impregnated resin beads may be removed from the dispersed or colloidal condition and dried to form a dry nanomagnetic nanocomposite if desired for added convenience shipping, storing, and subsequent handling, for example, dispersing and gelling the nanocomposite in alcoholic media.

Ultrafiltration is a known pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun. 16–18, 1982, which is incorporated herein by reference in its entirety. In ultrafiltration, the process fluid flows across a membrane with pore diameters in the range of 10 to 200 Angstroms. Solvents and species whose molecular size and weight are below the molecular weight cut-off will permeate through the membrane and emerge as an ultrafiltrate, while rejected species are progressively concentrated in the retentate process stream. Ultrafiltration differs from reverse osmosis in that it employs a more "porous" membrane which will not retain low molecular weight species such as solvent molecules, rather the membrane separation application is based on particle size. Ultrafiltration covers the particle diameter range of $10^{-3}$ to $10^2$ microns.

The nanomagnetic composite resin beads prepared as described above may be dried prior to micronization and then subsequently micronized to produce a dry powder composite for dispersion in a fluid or solid, for example, a non-dissolving liquid dispersion media or a polymer. This dispersion of crushed nanomagnetic composite and fluid or solid may subsequently be used in nanomagnetic composition formulation as illustrated herein.

The following examples are provided. All amounts are by weight percent unless specified otherwise.

EXAMPLE I

Iron and cobalt in a 2:1 atomic ratio were loaded into a commercially available Bio Rad cation exchange resin AG 50W-X8, 50–100 mesh, hydrogen form using the following preparation. 2.64 grams $FeCl_2.4H_2O$ and 1.59 grams $CoCl_2 6H_2O$ were dissolved in 200 mL deionized water. The solution was then added dropwise, while stirring, to 10 grams of previously dried cation exchange resin suspended in 100 mL deionized water. The resin was stirred for about 3 hours and then rinsed with deionized water until pH 6. This sample was found to have 6.19% Fe, 3.13% Co and 15.13% S. This sample was non magnetic as determined with a bar magnetic an a magnetometer and was used as a precursor material in Examples II and III.

EXAMPLE II

Three grams of wet loaded precursor material prepared in Example I were placed in 200 mL deionized water and heated to about 65 degrees C., while stirring. Twenty (20) mL of a 10% aqueous NaOH solution was added while stirring. Stirring and heating continued for 2.5 hours. The resin was visibly black and magnetic as measured by a magnetometer after 10 minutes of stirring. The resin was rinsed with deionized water until near neutral pH and then oven-dried. This sample was found to have 5.49% Fe and 2.78% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 13.18% S. The magnetocrystalline anisotropy of this material was found to be $10^7$ ergs/cc at room temperature. However, the coercivity and the anisotropy field of the particles increase when decreasing the volume. At room temperature, the particles having a radius of 5 nm have coercivity an anisotropy field of about a few thousand Oe. At low temperature, for example, T=10 K., the anisotropy field is as high as 60,000 Oe and the coercivity was about 10,000 Oe.

EXAMPLE III

Three grams of wet loaded precursor material prepared in Example I were oven-dried at 110 degrees C. 0.62 grams of this resin were put in 200 mL deionized water and heated to 60 degrees C. while stirring. 20 mL of a 10% NaOH solution was added while stirring. After a few hours, the resin was rinsed with deionized water until pH 6 and then oven-dried. This sample was found to have 4.22% Fe and 2.12% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 11.83% S. The magnetocrystalline anisotropy of this material was found to be $10^8$ ergs/cc.

EXAMPLE IV

Example I was repeated to prepare a precursor material containing $Fe^{3+}$ instead of $Fe^{2+}$. Thus, an atomic equivalent of $FeCl_3$ was selected and used in place of $FeCl_2$ of Example I.

EXAMPLE V

The preparation in Example II was repeated using the precursor material in Example IV. This resulted in a non magnetic material.

EXAMPLE VI

The preparation in Example III was repeated using the precursor material in Example IV. This resulted in a non magnetic material.

EXAMPLE VII

Iron and cobalt in a 2:1 atomic ratio were loaded into Bio Rad cation exchange resin AG 50W-X8, 50–100 mesh, hydrogen form using the following preparation. 2.64 grams $FeCl_2 \cdot 4H_2O$ and 1.59 grams $CoCl_2 \cdot 6H_2O$ were dissolved in 200 mL deionized water. The solution was then added dropwise, while stirring, to 10 grams of predried cation exchange resin in 300 mL deionized water. The resin was stirred for 18 hours and then rinsed until pH 6. 400 mL deionized water was added to the resin and heated to 60 degrees C. while stirring. 50 mL of a 10% aqueous NaOH solution was added dropwise and stirring continued for 1 hour. The resin was rinsed with deionized water until pH 6. The loaded resin was found to have 4.65% Fe and 2.36% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 12.91% S. The magnetocrystalline anisotropy of this material was found to be $10^8$ ergs/cc.

EXAMPLE VIII

To increase the loading of $CoFe_2O_4$, the resin prepared in Example VII was reloaded with iron and cobalt as follows. 400 mL deionized water was added to 90 wt % of the resin made in Example VII. 2.64 grams $FeCl_2 \cdot 4H_2O$ and 1.59 grams $CoCl_2 \cdot 6H_2O$ were dissolved in 200 mL deionized water and then added to the resin dropwise while stirring. The resin was stirred for 10 minutes and then rinsed with deionized water until pH 6. 400 mL deionized water was added to the resin and heated to 60 degrees C. while stirring. 50 mL of a 10% aqueous NaOH solution was added dropwise and stirring continued for 1 hour and 45 minutes. The resin was rinsed with deionized water until pH 6. This resin was found to have 8.62% Fe and 4.53% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 11.95% S. The magnetocrystalline anisotropy of this material was found to be $10^8$ ergs/cc.

EXAMPLE IX

To further increase the loading of $CoFe_2O_4$, the resin prepared in Example VIII was reloaded with iron and cobalt as follows. 400 mL deionized water was added to 90 wt % of the resin made in Example VIII. 2.64 grams $FeCl_2 \cdot 4H_2O$ and 1.59 grams $CoCl_2 \cdot 6H_2O$ were dissolved in 200 mL deionized water and then added to the resin dropwise while stirring. The resin was stirred for 10 minutes and then rinsed with deionized water until pH 6. 400 mL deionized water was added to the resin and heated to 60 degrees C. while stirring. 50 mL of a 10% aqueous NaOH solution was added dropwise and stirring continued for 1 hour and 15 minutes. The resin was rinsed with deionized water until pH 7.5 and then oven-dried at 110 degrees C. for 30 minutes. The resin was found to contain 10.72% Fe and 5.66% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 9.86% S. Magnetic characterization indicates magnetization of 7.8 emu per gram at 6 kG. The magnetocrystalline anisotropy of this material was found to be $10^8$ ergs/cc.

EXAMPLE X

A magnetic colloid of the material prepared in Example IX, also known as ferrofluid, was prepared as follows. 2.12 grams of the three (3) times loaded resin made in Example IX were roll milled for 8 days at about 120 feet per minute in a 4 ounce glass jar containing 212 grams ¼ inch stainless steel shot. 20 mL deionized water was added to the jar and milling continued for 16 hours. This fluid was then separated from the shot and centrifuged at 8 Gs for 15 minutes. The decanted fluid was ultrafiltered using a 30,000 molecular weight cut-off membrane under 36 psi nitrogen. About 15 mL filtrate was removed from the sample and discarded. The magnetic fluid had a density of 1.06 grams per mL. The fluid was oven-dried and found to contain 12.65% Fe and 6.22% Co in the correct ratio for $CoFe_2O_4$. Transmission electron microscopy (TEM) and selected area electron diffraction of the crystallites confirmed the presence of cobalt ferrite, $CoFe_2O_4$, during routine TEM analysis. The sample also contained 9.51% S. Magnetic characterization of the ferrofluid indicates a magnetization of 1.6 emu per gram at 6 kG and a magnetocrystalline anisotropy of $10^8$ ergs/cc.

EXAMPLE XI

A completely new, harder and more heat resistant material was made by mixing 0.39 grams of the magnetic liquid sample made in Example X with 0.39 grams of potassium silicate solution, Technical 865 or Zacsil 865 Solution (Zaclon Incorporated Cleveland, Ohio 44115). This was shaken for 4 minutes and dried at 110 degrees C. for 3 hours on a Teflon surface. The glass-like material was found to contain cobalt ferrite, $CoFe_2O_4$, and had a magnetocrystalline anisotropy of $10_8$ ergs/cc.

Other modifications of the present invention may occur to one of ordinary skill in the art based upon a review of the present application and these modifications, including equivalents thereof, are intended to be included within the scope of the present invention.

What is claimed is:

1. A magnetic composition comprised of cobalt ferrite nanoparticles dispersed in an ionic exchange resin, wherein the cobalt ferrite nanoparticles are of the formula $CoFe_2O_4$, wherein the composition has a magnetic anisotropy constant of about $10^7$ erg/cm$^3$ at about 300 K and further comprising a dopant selected from the group consisting of Group I, Group II, Group IIIa/b, rare earth elements, transition metals oxides thereof and mixtures thereof.

2. A composition according to claim 1 wherein the dopant is incorporated in the composition in an amount of from about 0.01 to about 10 weight percent of the composition.

3. A magnetic composition comprised of substantially monodispersed cobalt ferrite nanoparticles in an ionic exchange resin, wherein the cobalt ferrite nanoparticles are of the formula $CoFe_2O_4$, wherein the composition has a magnetic anisotropy constant of about $10^7$ erg/cm$^3$ at about 300 K and further comprising a dopant selected from the group consisting of Group I, Group II, Group IIIa/b, rare earth elements, transition metals oxides thereof and mixtures thereof.

* * * * *